No. 830,825. PATENTED SEPT. 11, 1906.
J. W. DEARBORN.
RAPID FIRE ORDNANCE.
APPLICATION FILED SEPT. 22, 1905.

No. 830,825. PATENTED SEPT. 11, 1906.
J. W. DEARBORN.
RAPID FIRE ORDNANCE.
APPLICATION FILED SEPT. 22, 1905.

No. 830,825. PATENTED SEPT. 11, 1906.
J. W. DEARBORN.
RAPID FIRE ORDNANCE.
APPLICATION FILED SEPT. 22, 1905.

Witnesses.
John W. Dearborn
Inventor

No. 830,825. PATENTED SEPT. 11, 1906.
J. W. DEARBORN.
RAPID FIRE ORDNANCE.
APPLICATION FILED SEPT. 22, 1905.

No. 830,825. PATENTED SEPT. 11, 1906.
J. W. DEARBORN.
RAPID FIRE ORDNANCE.
APPLICATION FILED SEPT. 22, 1905.

No. 830,825. PATENTED SEPT. 11, 1906.
J. W. DEARBORN.
RAPID FIRE ORDNANCE.
APPLICATION FILED SEPT. 22, 1905.

No. 830,825. PATENTED SEPT. 11, 1906.
J. W. DEARBORN.
RAPID FIRE ORDNANCE.
APPLICATION FILED SEPT. 22, 1905.

UNITED STATES PATENT OFFICE.

JOHN W. DEARBORN, OF DERBY, CONNECTICUT.

RAPID-FIRE ORDNANCE.

No. 830,825.　　　　　Specification of Letters Patent.　　　　Patented Sept. 11, 1906.

Application filed September 22, 1905. Serial No. 279,645.

*To all whom it may concern:*

Be it known that I, JOHN W. DEARBORN, a citizen of the United States, residing at Derby, in the county of New Haven and State of Connecticut, have invented a new and useful Improvement in Rapid-Fire Ordnance; and I do hereby declare the following, when taken in connection with the accompanying drawings and the characters of reference marked thereon, to be a full, clear, and exact description of the same, and which said drawings constitute part of this specification, and represent, in—

Fig. 3, an enlarged sectional view of the breech mechanism;
Fig. 3ª, a plan view of the firing-pin-sleeve washer;
Fig. 4, a side view of the cocking-lever;
Fig. 17, a side view of the sear-rod;
Fig. 18, an end view of the same;
Fig. 19, a side view of the sear-rod sleeve;
Fig. 20, an end view of the same;
Fig. 26, a sectional view of the tripping device;
Fig. 27, a top view of the tripping-plate;
Fig. 28, a side view of the same;
Fig. 29, a sectional view on line 29 29 of Fig. 28;
Fig. 30, a side view of the tripping-plate spring;
Fig. 31, a top view of the same;
Fig. 38, an end view of the bushing This invention relates to an improvement in rapid-fire ordnance, and particularly to that class which have vertically-movable breech-blocks to close the breech of the barrel.

One object of the invention is to provide means whereby the primer may be exploded, either by the force of the spring of the firing-pin or by electricity, without making any change in the action of the parts and so that if the gun fails to fire electrically the primer may be exploded by a blow from the firing-pin, or vice versa.

A further object is to provide means for operating the parts either automatically or manually, and another is to insure the proper action or movement of the breech-block and extractors; and the invention consists in the construction as will be hereinafter described, and particularly recited in the claims.

In illustrating my invention I show certain parts which are constructed and act in the same way as corresponding parts shown and described in Letters Patent No. 798,882, dated September 5, 1905.

The barrel 2 travels back and forth in a cradle 3, being connected therewith through a spring-operating rod 4, chain 5, and hooks 6 and 7. The breech is closed by a breech-block 8, which is guided for substantially vertical movement imparted by an operating-shaft 9 through an operating-shaft link 10 and breech-block-operating link 11. The extractors 12 are provided with studs 13, which enter cam-grooves 14 in the sides of the block, the grooves near the top forming pockets 15, and in order to insure the studs entering the pockets the studs are provided with frictional spring-pins 16 and the upper portions 17 of the grooves with shallow auxiliary grooves 18, into which the spring-pins 16 will ride and so that the studs 13 will be guided into the pockets 15.

In the breech-block is a firing-pin chamber 18, in which the firing-pin 19 is arranged, said pin formed with an annular groove 20. This pin passes through a firing-pin sleeve 21, from which it is insulated by a firing-pin-insulating bushing 22, said sleeve having a flange 23 at its forward end and a shoulder 24 at its rear end and the sleeve and insulating-bushing slotted at the bottom near the rear end. Over the sleeve 21 is placed a washer 25, which has a bearing against a shoulder 26 at the forward end of the firing-pin chamber. Around the sleeve 21 is a firing-pin spring 27, which bears at its forward end against the washer 25 and at its rear end against the forward end of a firing-pin plug 28, screwed into the rear face of the breech-block, the said plug having a clearance-slot 29 for the shoulder 24. Mounted in the breech-block is a cocking-lever 30, having an operating handle or grip 31, a firing-pin arm 32, and a sear-arm 33. This lever is mounted upon a pin 34. The upper portion of the lever is bifurcated, and between its sides is a compound-spring electric connection 37, mounted upon the cocking-lever pin 34, from which it is insulated by the bushing 35, the flange of which, with the washer 36, insulates it from the cocking-lever. The electric connector 37 has four arms, one, 38, extending forward into the path of a finger 39, projected from the upper end of the breech-block-operating link 11, from which it is insulated by a cap 40. Another arm 41 extends rearward into contact with the sear-rod 42, while a long arm 43 extends upward into the firing-pin groove 21, and a shorter arm 44 has a bearing upon an insulating-pin 45, mounted in the breech-block below the firing-pin chamber. The sear-rod 42 extends through the sear 46, from which it is insulated by a sear-rod-insulating bushing 47 and is formed with a contact end 8. The sear is cut away to expose the rod 42 and to form shoulders 49 and 50 for the sear-arm 33 of the cocking-lever. At the left-hand end the sear has a cam 51, as will be hereinafter explained, and is turned against the action of a flat sear-spring 52. Connected with a trigger 52ª, arranged forward of a grip 53, is a mechanical trigger-tube 54, formed from insulating material and provided at its rear end with a cap 55, having a notch 56 to engage with the cam 51 on the sear and so that if the tube 54 be moved rearward it will turn said cam, and hence rotate the sear. If desired, the tube 54 may be partially covered by a bearing-sleeve 54ª. Extending through the tube 54 is an electric contact-rod 57. This rod has an end 59, which projects from the forward end of the tube, and to the rear end is attached a contact-spring 60, which projects upward through an opening 61, formed for it in the tube 54, into contact with the end 48 of the sear-rod 42. Arranged in line with but forward of the end 59 of the contact-rod 57 is a contact-pin 62, adapted to be moved by a trigger 63, arranged forward of the trigger 52ª and normally held out of contact with the end 59 by a spring 64. This pin is connected with one wire 65 of an electric circuit leading to a battery, (not shown,) the other wire of the circuit extending into contact with the barrel in the usual way.

Figure 1:
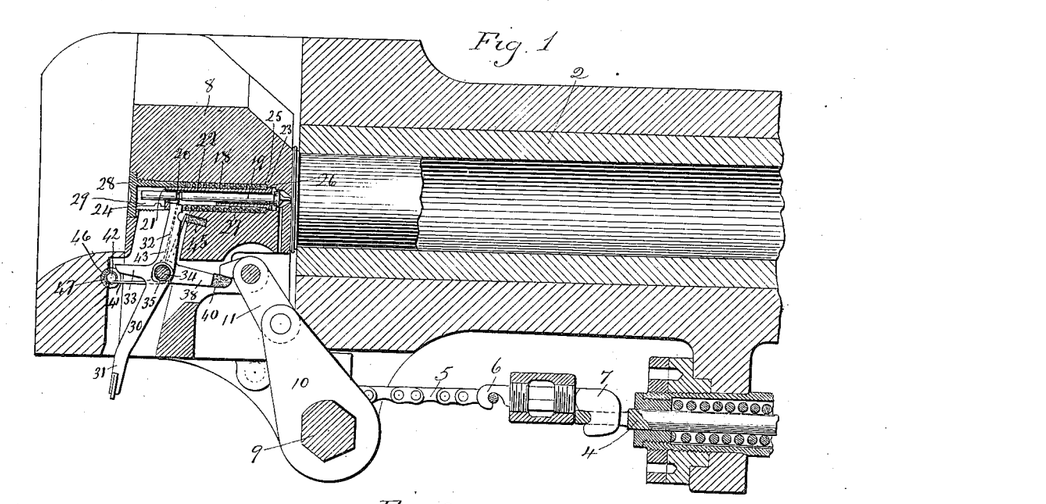
Figure 1, a sectional view of the breech mechanism of a rapid-fire gun constructed in accordance with my invention.
Figure 2:
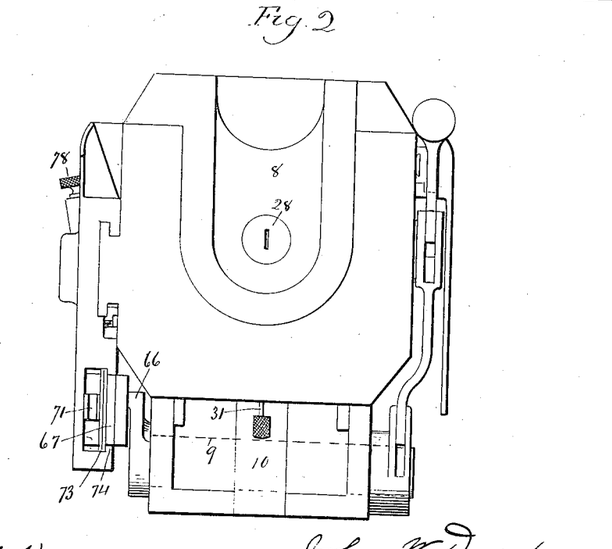
Fig. 2, a rear end view of the gun.
Figures 3, 3A:
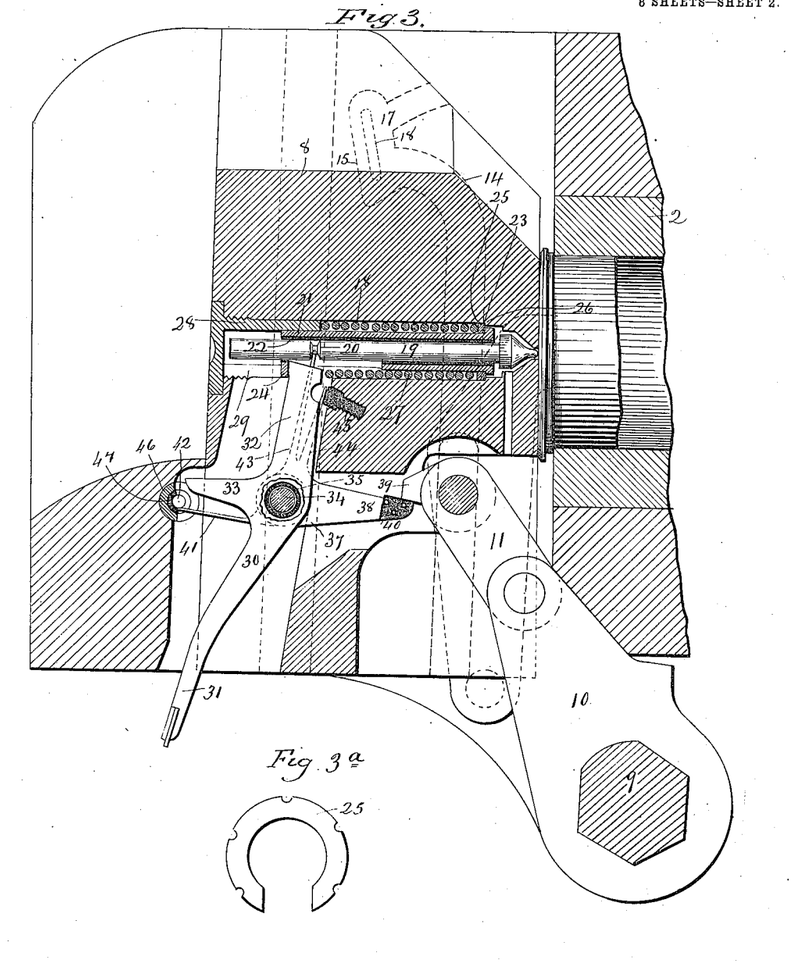
Figure 4:
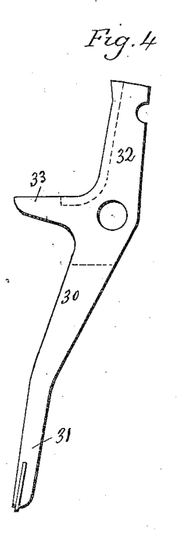
Figure 5:
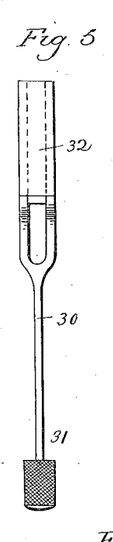
Fig. 5, an edge view of the same.
Figure 6:
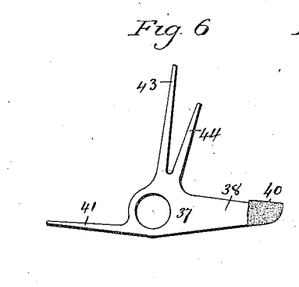
Fig. 6, a side view of the electrical connector between the firing-pin and sear.
Figure 7:
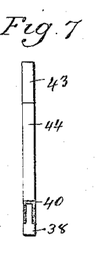
Fig. 7, an edge view of the same.
Figures 8, 9, 10:
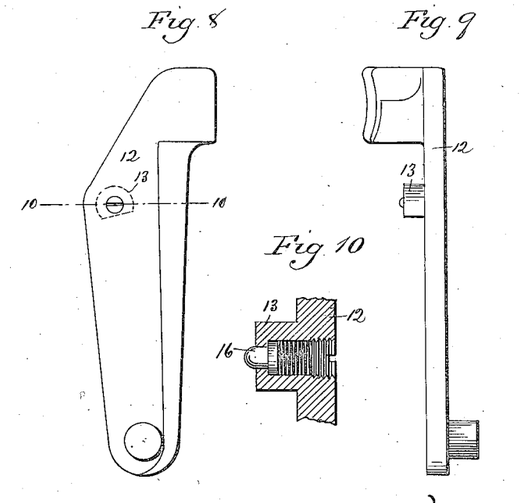
Fig. 8, a side view of one of the extractors.
Fig. 9, an edge view of the same.
Fig. 10, a sectional view on line 10 10 of Fig. 8.
Figure 11:
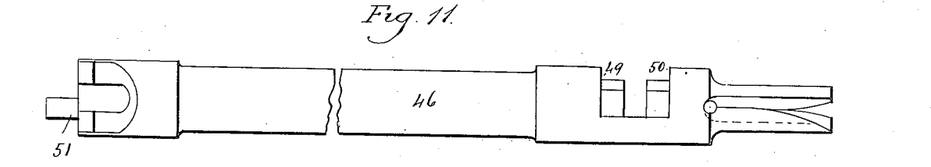
Fig. 11, a top or plan view of the sear.
Figure 12:
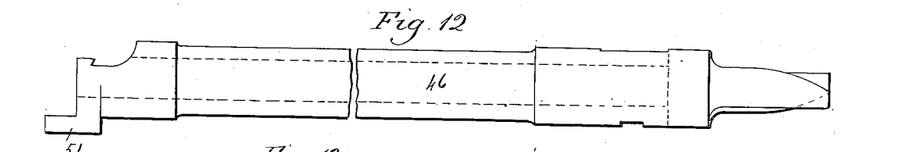
Fig. 12, a side view of the same.
Figure 13:
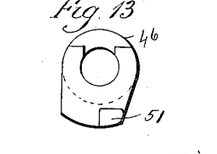
Fig. 13, an end view looking from the left.
Figure 14:
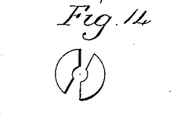
Fig. 14, an end view looking from the right.
Figure 15:
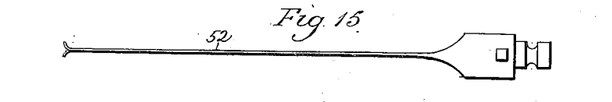
Fig. 15, a top view of the sear-spring.
Figure 16:
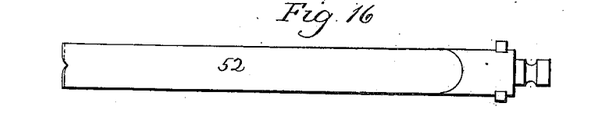
Fig. 16, a side view of the same.
Figures 17, 18, 19, 20:
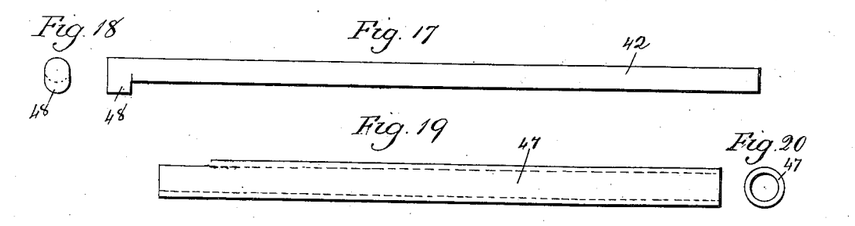
Figure 21:
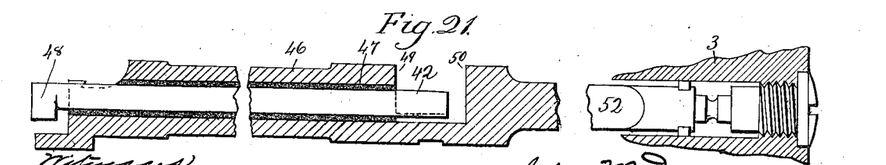
Fig. 21, a longitudinal section through the sear.
Figures 22, 23:
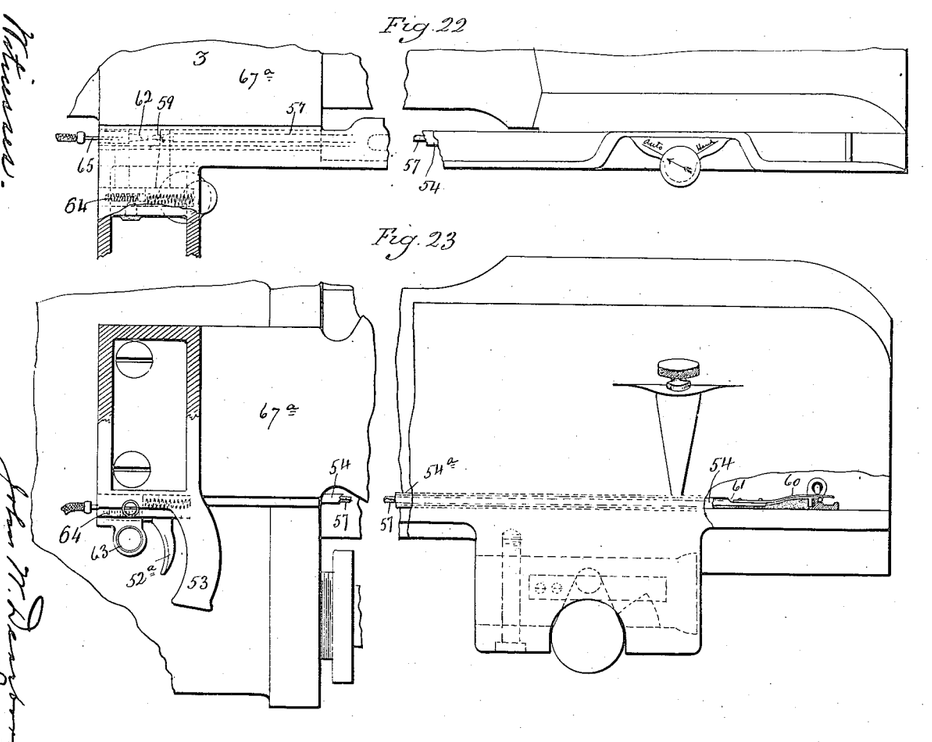
Fig. 22, a broken top or plan view of the trigger mechanism.
Fig. 23, a side view of the same.
Figure 24:
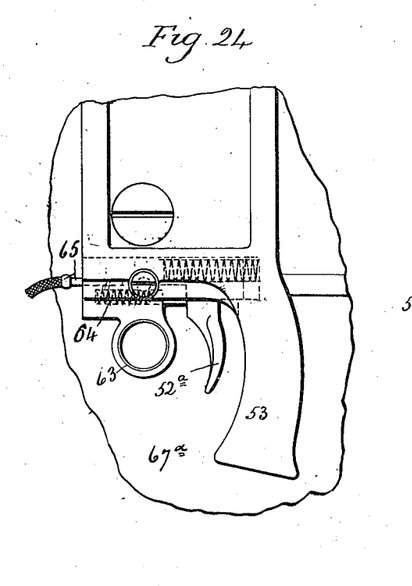
Fig. 24, an enlarged side view of the forward end of the trigger mechanism.
Figure 25:
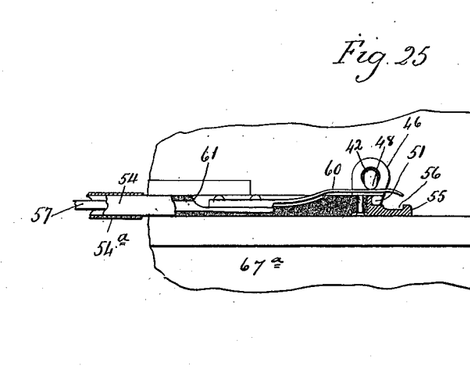
Fig. 25, an enlarged side view of the rear end of the same.
Figures 26, 27, 28, 29, 30, 31:
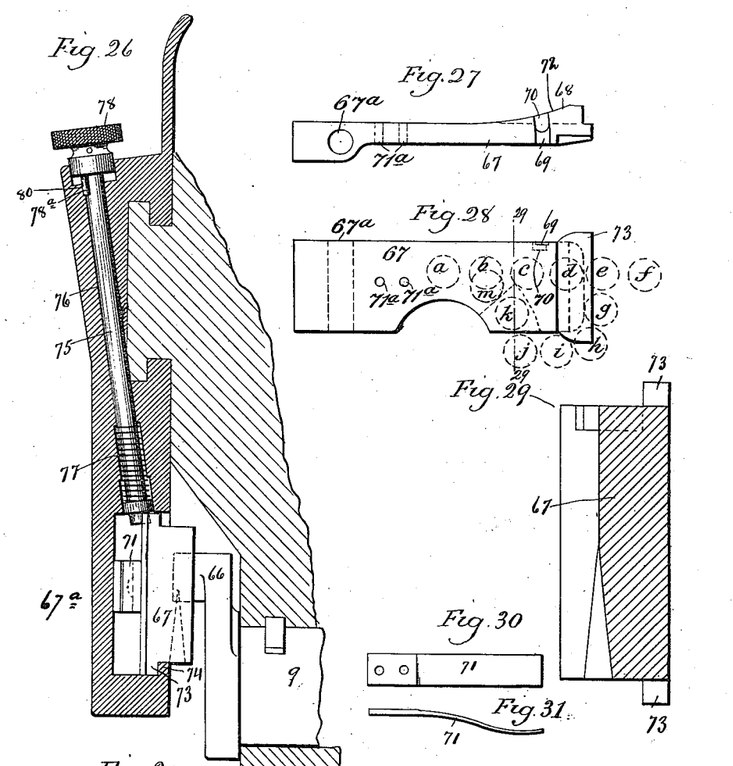
Figure 32:
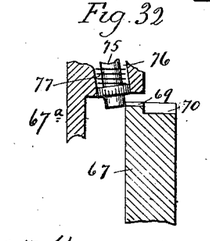
Fig. 32, a sectional view showing the tripping-plate stop-pin raised.
Figure 33:
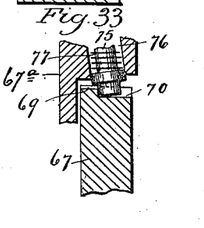
Fig. 33, a similar view with the pin seated in the pocket.
Figure 34:
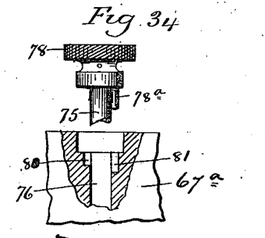
Fig. 34, a sectional view showing the top of the stop-pin with the two holes with which it may engage.
Figure 35:
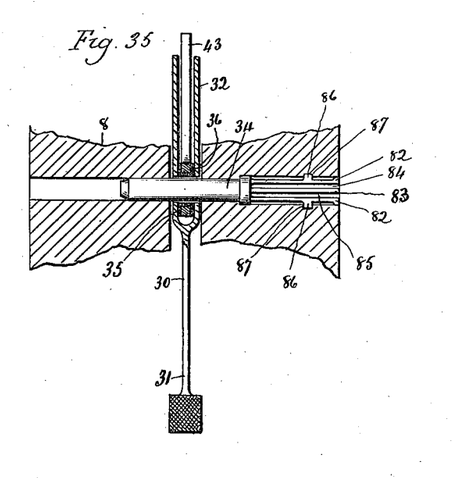
Fig. 35, a sectional view through the breech-block, showing the construction of the cocking-lever pin.
Figure 36:
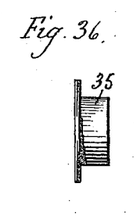
Fig. 36, a side view of the insulating-bushing for the cocking-lever.
Figure 37:
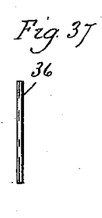
Fig. 37, a side view of the washer used in connection therewith.
Figure 38:
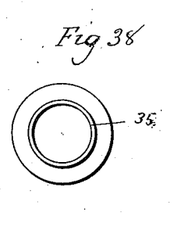

To turn the operating-shaft 9, that shaft is provided at its left-hand end with a cam 66, which normally stands against one side of a trip-plate 67, mounted in a guard 67ª and adapted to turn transversely upon a pivot 70 passing vertically through a hole 67ª, formed for it near the forward end of the cam-plate. This plate is formed at its rear end with a cam-surface 68 and in its upper edge with a slot 69, opening into a pocket 70. As the cam 66 on the operating-shaft 9 moves rearward, as indicated by the positions $a\,b\,c\,d\,e\,f$ in Fig. 28, it passes over the cam-surface 68 and will force the trip-plate outward against the pressure of a bowed spring 71, secured to the outside face of the plate through rivet-holes 71ª. After the cam 66 passes beyond the rear end of the trip-plate the spring 71 throws it inward into the path of the cam 66 and so that on the return movement the cam 66 strikes the rear end of the trip-plate, as at $e$, and the continued forward movement of the shaft 9 will cause the cam 66 to be turned, as at $g\,h\,i$, until the cam 66 escapes the lower edge of the trip-plate and rides up over an incline 72, as at $j\,k\,m$, into its former position, permitting the operating-shaft to be turned by the action of the spring-operating rod 4. The trip-plate is provided with wings or projects 73, which bear against shoulders 74, which prevent the trip-plate from being turned too far inward.

It is not always desirable to have the operating-shaft turned automatically, and to control the movement of the trip-plate I arrange a trip-plate stop-pin 75 in an outwardly-inclined opening 76 above and in line with the slot 69 in the trip-plate. This rod is forced downward by a spring 77, but may be raised by a knob 78 at its upper end. This knob has an eccentric-pin 78ª projecting from its lower face and adapted to enter either of two holes 80 or 81, formed for it in the frame, one hole being deeper than the other. On the top of the knob is an arrow or other indicating device to point to the words "auto" or "hand," accordingly as the knob is turned to have the pin 78ª enter into the deep or shallow hole. If the pin is in the shallow hole 80, the pointer will indicate "auto," and the end of the trip-plate stop-pin will be lifted out of the pocket 70 and so that the trip-plate will be free to turn. If, however, the pin 78ª is entered into the deep hole 81, the stop-pin will enter the pocket 70 when the trip-plate is turned outward and hold the same in that position and so that the plate will not obstruct the movement of the cam 66, and hence will not turn the operating-shaft 9. Provision will be made, however, for moving the shaft manually. Preferably the pin 34 for the cocking-lever will be provided at its outer end with two spring-arms 82, formed integral with it, but separated from the central portion 83 by slots 84 and 85, and these arms have studs 86, which enter notches 87, formed for them in the breech-block. By leaving the central portion 83 between the arms 82 a stop is formed which prevents the arms being pressed toward each other to a sufficient extent to set the arms in a compressed position. The pin by which the link 11 is connected to the breech-block will preferably be formed in the same way.

To cock the gun for manual operation, the lever 30 will be turned to move the sleeve 21, the flange 23 of which will move the washer 25 and compress the spring 27 and at the same time cause the arm 33 to turn the sear to the firing position. If then the trigger 52ª be pulled, the sear will be turned or freed to turn so as to release the cocking-lever, allowing the spring 27 to force the sleeve 23 forward, and this sleeve bearing against the head of the firing-pin will give it sufficient momentum to throw it against the primer with power to explode it. The forward movement of the firing-pin is against the force of the spring 43, which, however, is not a strong one, but simply sufficient to withdraw the firing-pin, so that its point will recede from the primer after discharge, so as to clear the same as the breech-block falls.

To fire the gun electrically, the trigger 63 will be pulled, which moves the contact-pin 62 into contact with the end 59, closing the circuit which leads through the rod 57, spring 60, sear-rod 42, spring-arm 41, spring-arm 43, firing-pin 19 to the primer, which is in contact with the barrel, and thence back to the battery.

It will thus be seen that the gun may be fired either electrically or mechanically, and if one should fail the other may be tried immediately.

Having fully described my invention, what I claim as new, and desire to secure by Letters Patent, is—

1. The combination with the barrel and vertically-movable breech-block having cam-grooves and pockets, of extractors having studs projecting into said cam-grooves, and spring-pins mounted in said studs and bearing against the bottoms of said grooves, substantially as described.

2. The combination with the barrel and vertically-movable breech-block having cam-grooves and pockets, auxiliary grooves in the upper portions of said cam-grooves, of extractors having studs projecting into said cam-grooves, and spring-pins mounted in said stud and coacting with said auxiliary grooves, substantially as described.

3. The combination with a breech-block having a firing-pin chamber, of a firing-pin therein, a sleeve surrounding said pin and insulated therefrom, a spring surrounding said sleeve and adapted to be compressed thereby, a sear-rod insulated from surrounding mechanism, an electrical connector having arms in contact with the firing-pin and with the sear-rod, a trigger-rod, a plug a trigger for moving said plug into contact with the trigger-rod for closing the circuit through said trigger-rod, sear-rod and firing-pin, substantially as described.

4. The combination with a breech-block having a firing-pin chamber, a firing-pin therein, a sleeve surrounding said firing-pin, a spring for moving said firing-pin forward, a connector in engagement with the said sleeve, a sear, a trigger-rod for turning said sear, and a trigger for moving said trigger-rod, substantially as described.

5. The combination with a breech-block having a firing-pin chamber, of a firing-pin therein, a sleeve surrounding said pin and insulated therefrom, a spring surrounding said sleeve and adapted to be compressed thereby, a cocking-lever, a sear for releasing the same, a rod extending through said sear, an electrical connector having spring-arms in contact with the firing-pin and sear-rod, a firing-tube to actuate said sear, a firing-rod extending through said tube into contact with the sear-rod, a trigger to move said tube, and a second trigger coupled with a contact-pin adapted to contact with said firing-rod, substantially as described.

6. The combination with a breech-block having a firing-pin chamber, of a firing-pin therein, a sleeve surrounding said pin and insulated therefrom, a spring surrounding said sleeve and adapted to be compressed thereby, a cocking-lever the upper portion of which is bifurcated, a sear for releasing said lever, a rod extending through said sear and insulated therefrom, an electric connector mounted between the sides of said cocking-lever and insulated therefrom, said connector having spring-arms in electric contact with the firing-pin and the sear-rod, a firing-tube to actuate said sear, a firing-rod extending through said tube into contact with the sear-rod, a trigger to move said tube, and a second trigger coupled with the contact-pin adapted to contact with said firing-rod, substantially as described.

7. In a breech-loading gun, the combination with the operating-shaft having an operating-cam, of a trip-plate pivoted in a guard connected with the frame and adapted to swing laterally out of and into the path of said operating-cam, said plate formed with a pocket in its upper edge, and a trip-plate stop-pin arranged above said plate and adapted to enter said pocket when the plate is turned outward and lock the same in its turned position, substantially as described.

8. In a breech-loading gun, the combination with an operating-shaft having an operating-cam, of a trip-plate pivoted at its forward end in the guard connected with the frame and its rear end adapted to swing laterally out of and into the path of the said operating-cam whereby said cam may pass the plate in one direction, but be turned thereby when moved in the opposite direction to rotate the said operating-shaft, substantially as described.

9. In a breech-loading gun, the combination with the shaft for operating the breech-block, said shaft having an operating-cam projecting from one side, of a trip-plate pivoted in a guard connected with the frame and adapted to swing laterally out of and into the path of said operating-cam, said plate formed with a pocket at its upper edge, and a trip-plate stop-pin arranged above said plate and vertically movable in said guard, the lower end of said pin adapted to enter said pocket when the plate is turned outward and lock the same in its turned position and formed at its upper end with an eccentrically-arranged depending pin adapted to enter either one of two holes formed to receive it in the upper edge of said guard, said holes being differentiated in depth whereby the stop-pin is held at different points of elevation, substantially as described.

In testimony whereof I have signed this specification in the presence of two subscribing witnesses.

JOHN W. DEARBORN.

Witnesses:
ETHEL A. MANN,
F. A. MILLER.